United States Patent [19]
Krawczyk et al.

[11] Patent Number: 6,021,867
[45] Date of Patent: Feb. 8, 2000

[54] AIR COMPRESSOR BEARING LUBRICATION

[76] Inventors: Julie A. Krawczyk, 1135 Fox Hill Dr., Apt. 317, Monroeville, Pa. 15146; Roger Drummond, 10 Pike St., Herminie, Pa. 15637; Brian L. Cunkelman, RD. #2 Box 351, Blairsville, Pa. 15717; Walter E. Goettel, RD. #3 Box 481, Monongahela, Pa. 15063; Daniel G. Wagner, 107 W. Genessee St., Pittsburgh, Pa. 15223

[21] Appl. No.: 09/126,535
[22] Filed: Jul. 30, 1998
[51] Int. Cl.[7] .............. F01M 1/08; F16N 9/04; F01D 11/00
[52] U.S. Cl. .............. 184/39.1; 415/111; 184/32
[58] Field of Search .............. 184/39.1, 26, 6.16, 184/32; 415/175, 176, 170.1, 110, 111, 112; 417/313, 490; 92/157, 158, 160; 123/196 R

[56] References Cited

U.S. PATENT DOCUMENTS

| | | | |
|---|---|---|---|
| 3,687,232 | 8/1972 | Stenger | 184/6.16 X |
| 3,713,513 | 1/1973 | Harris et al. | 184/6.16 |
| 4,586,875 | 5/1986 | Aman, Jr. | 417/313 X |

FOREIGN PATENT DOCUMENTS

| | | | |
|---|---|---|---|
| 511741 | 6/1952 | Belgium | 184/39.1 |
| 294822 | 11/1953 | Switzerland | 184/39.1 |

*Primary Examiner*—Tamara L. Graysay
*Assistant Examiner*—Colby Hansen
*Attorney, Agent, or Firm*—James Ray & Associates

[57] ABSTRACT

Apparatus for lubricating components in an air compressor having a crankcase for holding oil. The apparatus includes an oil pump located in the crankcase and oil, and a hollow plunger mechanically and hydraulically connected between the oil pump and an eccentric provided on a crankshaft of the air compressor. A filter for filtering the oil held in the crankcase is mounted on a block secured to an external surface of the crankcase. The block mounts the filter on the crankcase and in fluid communication with the pump such that filtered oil is directed to the hollow plunger from the pump after oil is directed into the pump from the filter and after oil is pumped from the crankcase and sent to the filter by the pump.

6 Claims, 2 Drawing Sheets

AIR COMPRESSOR BEARING LUBRICATION

FIELD OF INVENTION

The present invention relates, in general, to lubricating bearings in an air compressor and, more particularly, this invention relates to an oil pump and filter arrangement for supplying a filtered oil from the crankcase of the air compressor to plain insert and wrist pin needle bearings of the connecting rods and conrad style ball tapered roller bearings of such air compressor.

BACKGROUND OF THE INVENTION

Filtered oil in an air compressor of the type shown in U.S. Pat. No. 5,106,270 to Goettel, et al is not required for lubricating the bearings in the air compressor. However, it is believed that filtered oil will extend the service life of all lubricated parts as well as facilitate the use of rolling contact bearings in connecting rods and in wrist pin bosses of the high pressure and low pressure pistons in the air compressor taught in the referenced Goettel, et al patent.

The Goettel, et al air compressor employs an oil pump in the crankcase of the air compressor for supplying oil to the crankshaft and to the bearings of such air compressor. A hollow reciprocating shaft, or plunger, operates the pump by being connected at one end thereof to an eccentric journal located on the crankshaft, while the other end extends to the pump to provide alternate pumping cycles in the pump. The eccentric journal determines the stroke of the plunger and thus the capacity of the oil pump.

Low pressures of the alternate cycles draw oil from the crankcase into the pump. High pressures of the alternate cycles direct oil from the pump to the hollow plunger. From the hollow plunger oil flows to the eccentric journal and from the eccentric journal via drilled passages in the crankshaft to the bearings on the crankshaft, then to rifle drilled passages in the connecting rods to the connecting rod wrist pins; oil then returns to the crankcase.

SUMMARY OF THE INVENTION

The present invention modifies the above plunger driven oil pump by the use of an externally mounted oil filter, having a filtering element, and an oil filter adapter mounting block added at one end of a housing of the pump. The adapter block provides fluid communication between the externally mounted oil filter and internal oil passages of the air compressor. Inlet and discharge valves of an oil pump cartridge are used to open and close the fluid communication between the oil pump cartridge and filter in accordance with the pumping cycle effected by the hollow plunger. Oil is drawn by suction from the crankcase of the air compressor at the upstroke of the hollow plunger, through a strainer into the body proper of the oil pump and through the inlet valve, when open, provided in the cartridge. On the downstroke of the plunger, pressure across the inlet valve reverses and the inlet valve closes. The discharge valve is opened by generated oil pressure thereby forcing oil from the oil pump cartridge, through the mounting block and into an outer peripheral portion of the filter element. Oil is forced through the filter element and clean oil is directed to the center of the filter, and back through the mounting block, into the pump cartridge, where the oil, now filtered, is pushed into the hollow plunger for travel to bearings of such air compressor.

BRIEF DESCRIPTION OF THE DRAWINGS

The present invention, along with its advantages and objectives, will be better understood from the following more detailed description and the accompanying drawings, FIGS. 1 and 2 of which are respectively sectional views of a crankcase of an air compressor and an oil pump located in a lower portion of the air compressor for lubricating bearings disposed on a crankshaft of such air compressor with a filtered oil.

DESCRIPTION OF A PRESENTLY PREFERRED EMBODIMENT OF THE INVENTION

Figure 1:
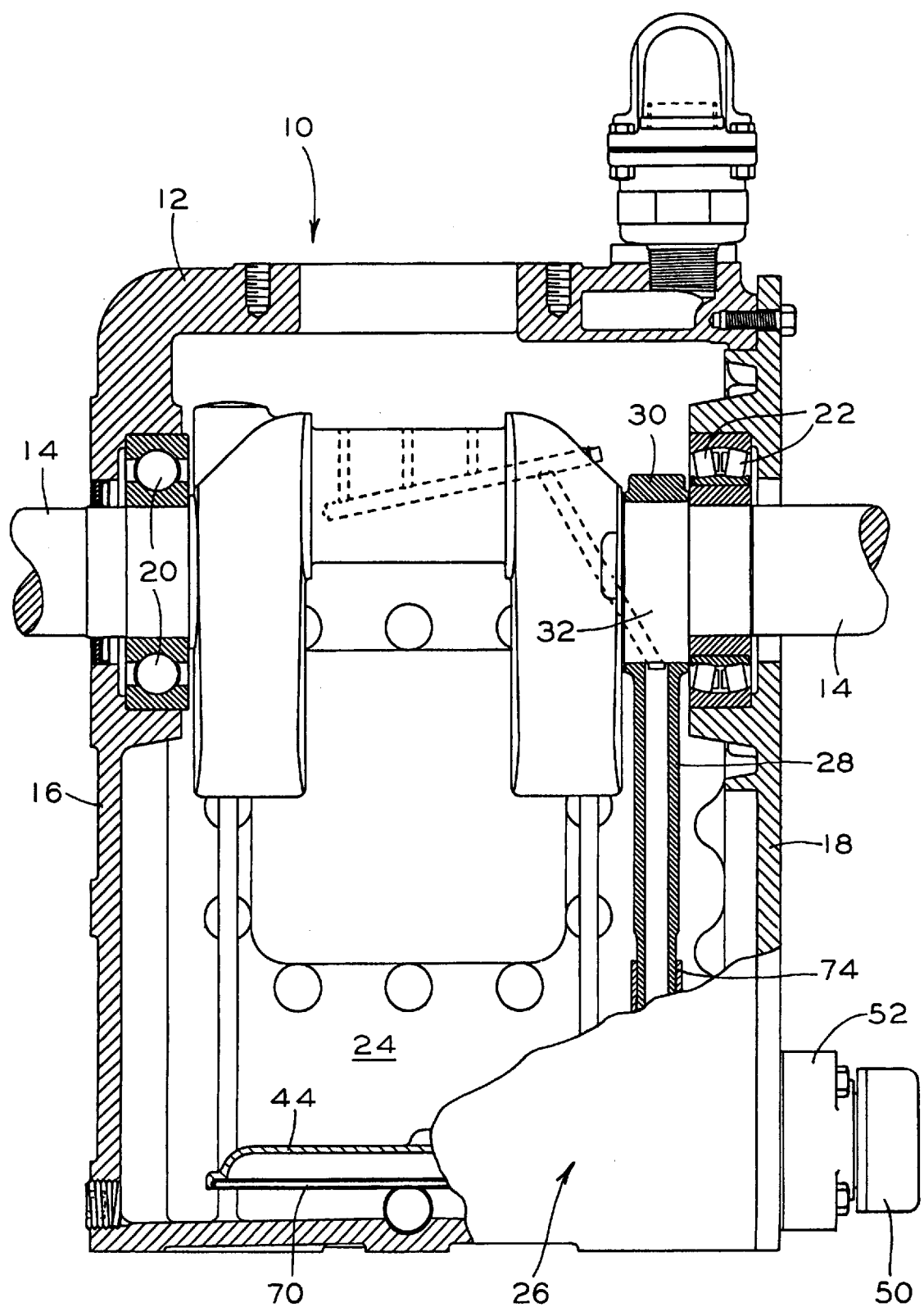

Referring now to the drawings, a partial sectional view of a housing, generally designated 10, of a crankcase of an air compressor 12 is shown in FIG. 1.

The compressor (not otherwise depicted in the FIG. 1) includes a crankshaft 14 extending between the opposed walls 16 and 18 of the housing 10 and mounted therein by bearings 20 and 22. Such housing 10 provides generally a crankcase which serves, inter alia, as an oil sump for lubricating the crankshaft and bearings. Lubrication is supplied under pressure to the crankshaft and bearings by an oil pump, generally designated 26, located in the lower portion of such sump and crankcase 24 and, by a hollow plunger or shaft 28, eccentrically connected at a first end thereof to the crankshaft 14 and to the pump 26 at its other end. The end eccentrically connected to the crankshaft 14 includes an integral oil distribution collar 30 that is mounted on an eccentric journal 32 of the crankshaft 14. The eccentric journal has a surface that can be machined on such crankshaft 14 to provide the crankshaft 14 with an integral eccentric.

Figure 2:
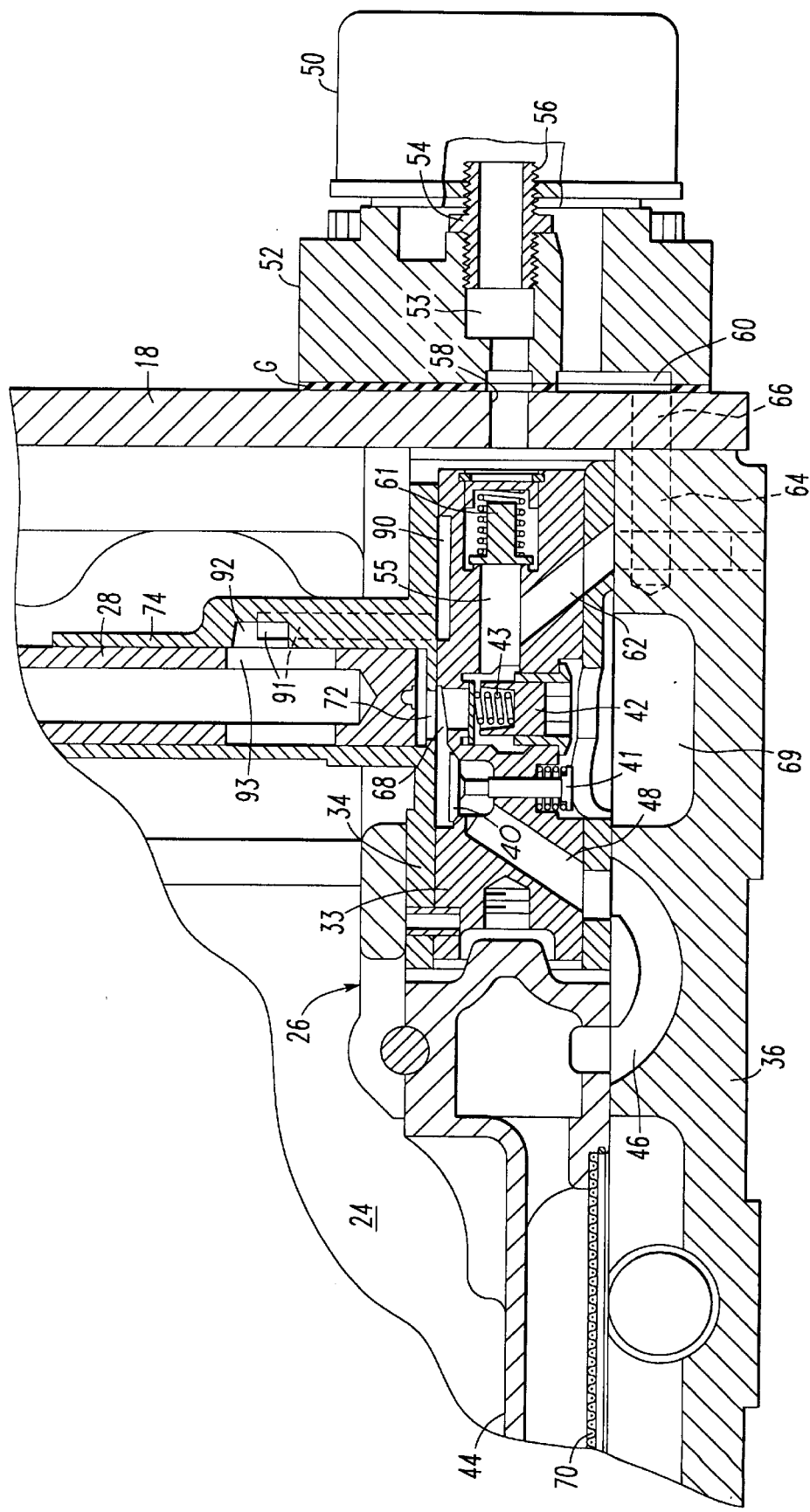

The oil pump 26 (FIG. 2) includes a cartridge 33 located in a body portion 34 of such oil pump 26. The pump body 34 is shown located in the crankcase 10 at a location formed by the intersection of a vertical crankcase wall 18 and lower horizontal wall 36 of the crankcase 10. The pump body 34 houses the cartridge 33 and includes a port 72 and an integral upward extension 74 discussed hereinafter. As shown in the drawing figure, two valves 40 and 42 are located in a side-by-side, "reverse" manner that provides a reverse opening and closing procedure against the force of respective coil springs 41 and 43 located in internal recesses sized to seat the valves and springs in the cartridge 33. Further details of the operation of such valves 40 and 42 are discussed in further detail below.

Valve 40 is an inlet valve that communicates with a lateral oil retrieval portion 44 (suction strainer) of the pump 26 via a curved hollow passageway 46 provided in the lower wall 36 which, in turn, communicates with an internally slanted passage 48 provided in the structure of the cartridge 33 physically aligned with such passageway 46.

Valve 42 is an outlet valve that communicates with an oil filter 50 mounted on a lower portion of housing wall 18 via a mounting block 52 suitably secured to the outside surface of bearing housing wall 18 of the crankcase housing 10. The mounting block 52 can be secured to the housing wall 18 in any appropriate manner and is provided with an internal outlet opening 53 which provides a path for fluid flow from the filter 50 to the interior of oil pump 26.

An oil filter adapter 54 is externally threaded for threading into an opening 53 of mounting block 52 and into an opening 56 provided in filter 50, which openings are internally threaded to receive the adapter 54. A horizontal passage 55 is provided in the cartridge 33 and a corresponding port 58 is provided in the crankcase wall 18 of the air compressor housing that is aligned with an outlet opening 53 formed in such mounting block 52. The mounting block 52 is provided with a second inlet opening 60 for admitting unfiltered oil into the filter 50 from the pump 26.

At the end of the passage 55, toward the filter 50 and located within the cartridge 33, a spring loaded, pressure relief valve 61 is provided for controlling the pressure of oil flow from the cartridge 33 to the filter 50 and thus from the filter 50 to the hollow plunger 28.

Another slanted internal passage 62 is shown provided in the cartridge 33 and communicates with a second passage 64 provided in the lower wall 36 of crankcase housing 10, aligned with the slanted passage 62 and with another port 66 provided in such housing wall 18. Port 66 is aligned with inlet opening 60 in the mounting block 52. This is the path the oil takes from the cartridge 33 to the oil filter 50.

In a quick synopsis of the operation of pump 26, as thus far described, oil is drawn into the pump 26 through a strainer 70, mounted in a lateral portion 44 of the pump 26, from reservoir 24, and pressurized oil leaves the pump 26 and filter 50 and enters a cavity 90 located between the cartridge 33 and housing body 34. The oil then travels through a vertical passage 91 (shown as dotted lines in the drawing figure) to a cavity 92 provided in the upper portion of such housing body 34, i.e., housing 34 has an upper extension 74 located around the lower end of hollow shaft 28. Pressurized oil then flows from a cavity 92 into the hollow portion of the shaft (plunger) 28 through an opening 93 provided in the shaft 28. Pressurized oil is then directed up the shaft 28 to bearings and to other components in the air compressor needing lubrication.

The operation of the pump 26, the valve 61, the mounting block 52, the filter 50 and the hollow shaft 28 is as follows:

Rotation of oil pump distribution collar 30 on the crankshaft eccentric 32 (FIG. 1) moves the hollow shaft 28 in upwardly and downwardly strokes. The downstroke of the hollow shaft 28 translates its lower end toward the port 72 provided in the pump housing 34 thereby forcing a supply of oil already within a common area 68 above inlet valve 40 against an upper portion of the valve 40. This closes the valve 40 with the aid of its coil spring 41. Oil entered the common area 68 from the sump 24 through strainer 70, as discussed above and below.

The same hydraulic force exerted on the supply of oil in common area 68 opens outlet valve 42 against its coil spring 43 thereby forcing the supply of oil from the common area 68 through the valve 42 and to and through passages 62, 64, 66 and 60 to the external periphery of oil filter 50. A gasket G is located between the mounting block 52 and the outer face of wall 18 to prevent leakage of oil in the process of passing through the wall 18 and mounting block 52 via openings 58, 60 and 66.

In the passage 55, a pressure relief valve 61 regulates the oil pressure to a predetermined maximum value so that overpressure damage does not occur to the air compressor's bearings. This is accomplished by an internal spring having a predetermined spring rate, or constant, that provides the needed maximum pressure value.

Oil thus travels under the filter 50 under the hydraulic pressure of the downstroke of the hollow shaft 28, the pressure being regulated by the valve 61. Oil is directed to a cavity 90 from the oil filter 50 via oil filter adapter 54, the opening 53 in mounting block 52 and the port 58 provided in wall 18, through a drilled port in wall 18 (not visible) connecting port 58 to cavity 90, up through passage 91 into cavity 92, through opening 93 and into the hollow shaft 28 where oil flows to crankshaft 14 for lubricating purposes.

On the upstroke of plunger 28, oil pressure is relieved in the common area 68, which is effective to draw oil from reservoir 24 through the strainer 70 into pump 26. With reduced oil pressure in the common area 68 and above the inlet valve 40, the inlet valve 40 opens against the force of its coil spring while outlet valve 42 closes under the force of its spring. Thus, such relief of pressure in the common area 68 above the valves 40 and 42 causes the valves 40 and 42 to reverse their positions relative to the downstroke of the shaft 28.

With each downstroke of the cycle of hollow shaft 28 toward port 72, oil is forced from the cavity 90 and into the hollow center of the shaft 28 and through such center up to the eccentric journal 32, to bearings 20 and 22, and to piston rod bearings (not shown) riding on the crankshaft 14.

The lower wall 36 of the compressor housing is shown as an integral part of the structure and operation of pump 26. The oil flow through these passages could be accomplished by hoses but passages 46, 64 and 69 provide a more "fail-safe" type of operation, i.e., no broken hoses.

While the presently preferred embodiment for carrying out the instant invention has been set forth in detail above, those persons skilled in the art of locomotive compressors to which this invention pertains will recognize various alternative ways of practicing the invention without departing from the spirit and scope of the patent claims appended hereto.

We claim:

1. An apparatus in combination with an air compressor for lubricating certain components in the air compressor, said compressor having a crankcase for holding lubricating oil, said apparatus comprising:

(a) an oil pump located in said crankcase and said lubricating oil;

(b) a hollow plunger mechanically and hydraulically connected between said oil pump and an eccentric provided on a crankshaft of said air compressor;

(c) a filter for filtering said lubricating oil held in said crankcase; and (d) a block secured to an external surface of said crankcase for mounting said filter on the crankcase and in fluid communication with said oil pump such that filtered lubricating oil is directed to said hollow plunger from said oil pump after lubricating oil is directed into said oil pump from said filter and after lubricating oil is pumped from said crankcase and sent to said filter by said oil pump.

2. The apparatus, according to claim 1, wherein said oil filter and said mounting block are located at one end and externally of said oil pump.

3. An apparatus in combination with an air compressor for lubricating bearings located on a crankshaft in the air compressor, said compressor having a crankcase for containing lubricating oil, the apparatus comprising:

(a) an oil pump disposed in said crankcase and in said lubricating oil, said oil pump including a cartridge containing an inlet valve, an outlet valve and an oil pressure relief valve;

(b) a hollow plunger having a first end thereof connected to an eccentric located on said crankshaft of said air compressor and a second end disposed in a pump housing;

(c) means for retrieving lubricating oil from said crankcase and directing said lubricating oil to said oil pump cartridge; and (d) an oil filter connected in fluid communication with said pump cartridge by a mounting block, said hollow plunger being effective to close said inlet valve and to open said outlet valve on a downstroke of said hollow plunger and to reverse said closing and opening on an upstroke of said hollow plunger, said closing of said inlet valve and said opening of said outlet valve being effective to direct lubricating oil from said oil pump and to said filter and from said filter for direction to said hollow plunger and from said hollow plunger to said bearings located on said crankshaft at a pressure level controlled by said pressure relief valve.

4. The apparatus, according to claim 3, wherein each of said inlet and said outlet valves contain biasing springs.

5. The apparatus, according to claim 3, wherein said pressure relief valve operates against a spring of known spring rate to limit maximum oil pressure delivered to said bearings for lubrication.

6. The apparatus, according to claim 3, wherein said apparatus further includes a strainer through which said lubricating oil is admitted to said pump cartridge, said strainer being located at an end of said pump housing opposite to that of said pressure relief valve.

* * * * *